United States Patent
Moore

(10) Patent No.: US 10,846,634 B1
(45) Date of Patent: Nov. 24, 2020

(54) COMBINED PHYSICAL AND DIGITAL PROJECT PLANNING SYSTEM

(71) Applicant: ROBINS & MORTON GROUP, Birmingham, AL (US)

(72) Inventor: Steven Andrew Moore, Birmingham, AL (US)

(73) Assignee: STICKFLAME, LLC, Birmingham, AL (US)

( * ) Notice: Subject to any disclaimer, the term of this patent is extended or adjusted under 35 U.S.C. 154(b) by 240 days.

(21) Appl. No.: 16/167,301

(22) Filed: Oct. 22, 2018

Related U.S. Application Data

(60) Provisional application No. 62/575,309, filed on Oct. 20, 2017.

(51) Int. Cl.
*G06Q 10/06* (2012.01)
*G06F 16/22* (2019.01)

(52) U.S. Cl.
CPC ..... *G06Q 10/063118* (2013.01); *G06F 16/22* (2019.01)

(58) Field of Classification Search
CPC ...... G06Q 10/02; G06Q 10/087; G06Q 30/02; G06Q 30/0645
See application file for complete search history.

(56) References Cited

U.S. PATENT DOCUMENTS

| | | | |
|---|---|---|---|
| 9,135,604 B2 | 9/2015 | Ritter et al. | |
| 9,239,719 B1 | 1/2016 | Feinstein et al. | |
| 2003/0120525 A1 | 6/2003 | Feser et al. | |
| 2010/0191552 A1* | 7/2010 | Behrens | G06Q 30/0261 705/5 |
| 2015/0347125 A1* | 12/2015 | High | G06F 3/04842 717/101 |

FOREIGN PATENT DOCUMENTS

| | | |
|---|---|---|
| DE | 102008014038 | 9/2009 |
| IN | 201721000526 | 1/2017 |

OTHER PUBLICATIONS

Retrieved from the internet: https://github.com/Griffon26/scrumboardtracker; Nov. 25, 2016; pp. 1-2.
Retrieved from the internet: https://www.researchgate.net/publication/301444920_The_dBoard_A_Digital_Scrum_Board_for_Distrubuted_Software_Development (via 'Download' button); Nov. 30, 2015.
Retrieved from the internet: https://confluence.spartez.com/display/ScrumPrint/Setting+up+the+physical+board; Apr. 17, 2018.

\* cited by examiner

*Primary Examiner* — Manuchehr Rahmjoo
(74) *Attorney, Agent, or Firm* — Nicholas J. Landau; Bradley Arant Boult Cummings LLP

(57) ABSTRACT

Methods and devices to implement a combined physical and digital project planning system are described. The system functions by optically processing notes on a planning board, and converting the information embodied in the notes into digital information. The digital information can then be accessed by multiple users. The digital information is updated when notes are added, removed, or rearranged.

21 Claims, 13 Drawing Sheets

US 10,846,634 B1

COMBINED PHYSICAL AND DIGITAL PROJECT PLANNING SYSTEM

CROSS-REFERENCE TO RELATED APPLICATIONS

This application cites the benefit of the filing date of provisional U.S. patent application No. 62/575,309, filed on 20 Oct. 2017.

BACKGROUND

Field

The present disclosure relates generally to task organization planning systems to share information about progress and scheduling of tasks among multiple individuals.

Background

There are many digital project planning tools available to sequence work processes and track performance. There are also collaborative methodologies that utilize physical, handwritten sticky notes, which are arranged on a wall. However, there is typically a great disconnect between physical, collaborative planning and digital planning. Each methodology has its advantages, however, it takes a great deal of manual effort to reconcile the discrepancies created when utilizing both methodologies.

One of the current demands by project professionals is simplicity in project planning. Simple, collaborative, and hands-on methodologies are important to project teams around the world. In an ideal system, all project stakeholders can actively participate in and track commitments, performance, issues, and other key aspects of the work, in one simple place.

With the typical sticky note wall planning solution, activities are hand written on many different colors of sticky notes. These handwritten notes require manual effort to produce and are often difficult to read and accommodate limited information.

Sticky notes themselves, while useful for posting information on a wall, have their limitations. They can lose their stickiness and fall off of the wall. It also takes a lot of effort to move large groups of sticky notes back and forth; as each note needs to be moved individually. Another disadvantage of sticky notes is the difficulty in aligning them. The user also needs to keep a large stock of various colors and working markers on hand at all times.

SUMMARY

The present disclosure describes a combined physical and digital project planning system, components thereof, and methods of using the same, which addresses the problems described above by utilizing image analysis to locate machine-readable printed markers. By use of various embodiments of this invention, a physical project planning wall can be maintained and mirrored in a digital project planning system. It is to be understood that not every embodiment of the invention described herein will address every problem detailed in the background section.

In a first aspect, a method of synching a physical task management board with a digital task management system is provided. The method comprises: providing a physical task management board having a first axis and a second axis, the physical task management board comprising: a first and a second time marker arranged along the first axis and reversibly attached to the board, each said time marker comprising a first and second machine readable time code (respectively) that encodes a unique time and a human-readable indicator of said unique time; a task start marker positioned so as to be approximately collinear with the first time marker along the second axis, the task start marker comprising a machine-readable task code that encodes a task and a human-readable indicator of said task; and a task finish marker positioned so as to be approximately collinear with the second time marker along the second axis and to be approximately collinear with the task start marker along the first axis, the task finish marker comprising the machine-readable task code and the human-readable indicator of said task; obtaining one or more digital images of the physical task management board that together include the first machine-readable time code, the second machine-readable time code, the machine-readable task code on the task start marker, and the machine-readable task code on the task finish marker; computing a computed relative position of each of the first time marker, second time marker, task start marker, and task finish marker based on an analysis of the one or more digital images; assigning the first unique time as a start time of the task based on the computed relative positions of the task start marker and the first time marker; assigning the second unique time as a finish time of the task based on the computed relative positions of the task finish marker and the second time marker; and recording database information on a machine-readable medium accessible to the digital task management system, the database information including the task, the start time of the task, and the finish time of the task.

In a second aspect, a tile for supporting a machine-readable marker on a slat wall is provided. The slat wall comprises multiple panels between multiple parallel grooves each having a groove depth and a groove width. The tile comprises: a top section contiguous with a bottom section; the bottom section comprising a flat marker surface dimensioned to accept the machine-readable marker, and having a beveled lower edge such that the thickness of the bottom section decreases in the downward direction; and the top section being L-shaped having a vertical stem and a horizontal bar, wherein the stem is slightly shorter than the groove width, and wherein the bar is about as long as the groove depth, such that when the top section is inserted into a groove on a slat wall the bar extends into the groove and the stem extends behind one of the panels.

In a third aspect, a joint physical-digital task management system is provided. The system comprises: a slat wall comprising multiple panels between multiple parallel grooves each having a groove depth and a groove width; multiple tiles each comprising a top section being L-shaped and having a vertical stem and a horizontal bar, wherein the stem is slightly shorter than the groove width, and wherein the bar is about as long as the groove depth, inserted into a groove on the slat wall such that the bar extends into the groove and the stem extends behind one of the panels, the multiple tiles including: a first time marker reversibly attached to a first tile of said multiple tiles, the first time marker comprising a first machine-readable time code that encodes a first unique time and a human-readable indicator of said unique time, a second time marker reversibly attached to a second tile of said multiple tiles, the second time marker comprising a second machine-readable time code that encodes a second unique time and a human-readable indicator of said unique time; a task start marker reversibly attached to a third tile of said multiple tiles, the task start marker comprising a machine-readable task code that encodes a task and a human-readable indicator of said task; a task finish marker reversibly attached to a third tile of said multiple tiles, the task finish marker comprising the machine-readable task code and the human-readable indicator of said task; a digital camera for obtaining one or more digital images of the multiple tiles; a computing system programmed or configured to analyze the one or more digital images, compute a computed relative position of each of the first time marker, second time marker, task start marker, and task finish marker based on an analysis of the one or more digital images; assign the first unique time to a start time of the task based on the computed relative positions of the task start marker and the first time marker; assign the second unique time to a finish time of the task based on the computed relative positions of the task finish marker and the second time marker; and record database information on a machine-readable medium accessible to a digital task management system, the database information including the task, the start time of the task, and the finish time of the task.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

A. Definitions

Figure 1:
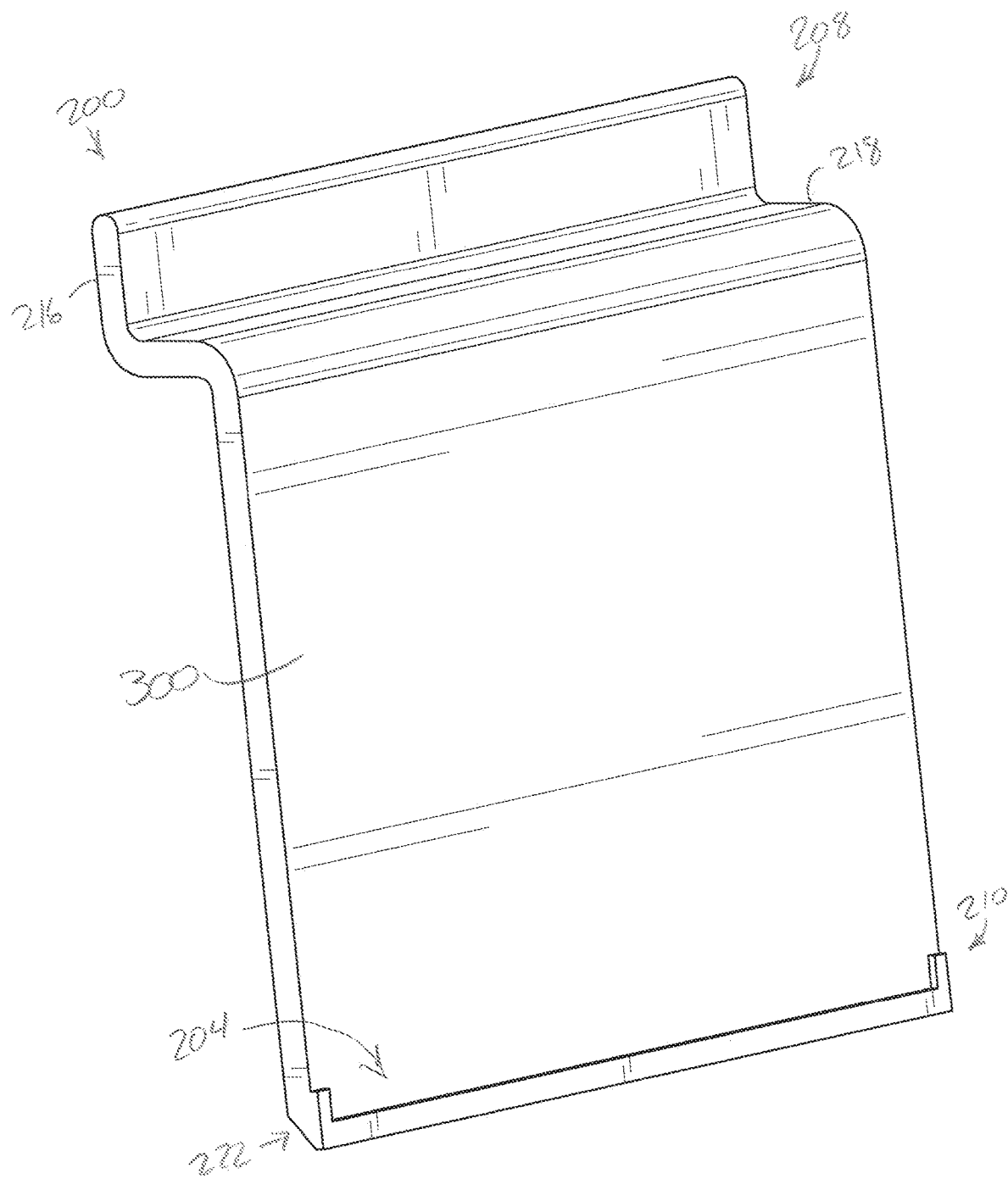
FIG. 1. A perspective view of an embodiment of a tile for mounting markers on a slat wall.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity or geometric property, given the general nature or precision of the type of measurements involved. Typical, exemplary degrees of error or variation are within 20 percent (%), preferably within 10%, and more preferably within 5% of a given value or range of values. Numerical quantities and geometric properties given in this description are approximate unless stated otherwise, meaning that the term "about" or "approximately" can be inferred when not expressly stated. Numerical quantities in the claims are exact unless stated otherwise.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise.

Spatially relative terms, such as "under", "below", "lower", "over", "upper" and the like, may be used herein for ease of description to describe one element or feature's relationship to another when the apparatus is right side up. Specifically, such spatially relative terms apply when a task board is hung or mounted on a vertical structure (such as a wall) and/or when a tile is attached to such a task board.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

Terms like "comprising" and "included" are intended to be inclusive, and not exclusive, of additional possible elements apart from what is listed.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

When method steps are described, the steps may occur in the order presented, or in any order, unless specifically stated otherwise.

B. Systems and Methods of Digitally Synching a Task Management Board

A method of synching a physical task management board 2 with a digital task management system 4 is provided. The task management board 2 serves as a substrate for multiple markers 6, which may be removed and moved as needed. The method utilizes a computing system 8 to obtain a digital image 70 of the markers 6 and, depending on their locations, assigns start times and finish times to tasks 54 indicated by the markers 6. The use of image analysis obviates the need for mechanical or electronic means to monitor the locations of the markers, such as RFID. As a result the hardware itself may be of greater simplicity and lower cost than earlier systems. Some embodiments of the task management board 2 contain no electronic and/or mechanical means for tracking the location of the markers 6.

The embodiment of the task management board 2 shown in the figures is a slat wall, but the task management board 2 is not limited to this embodiment. The task management board 2 may be a plain surface, such as a wall; in such embodiments the markers 6 will be configured to reversibly attach to such a plain surface. In such embodiments the markers 6 may take the form of stickers with low-tack pressure sensitive 110 (such as "sticky notes") that require no special attachment structure on the board 2.

The board 2 can be said to have two axes, a first axis 10 and a second axis 12. The two axes 10, 12 represent generally orthogonal dimensions, such as the height and width of the board 2, as well as the corresponding directions (i.e., vertical and horizontal). The markers are arranged based on the axes 10, 12 to indicate various aspects of projects and tasks, such as the start time 80 and the finish time 82 of a task. Additional types of task markers could include task constraint markers (identifying a constraint on progressing with the task, and its position indicating the period of time affected), milestone markers (identifying a significant milestone toward completion, its position indicating when the milestone was reached, including both milestone start markers 421 and milestone finish markers 422), and "filler" markers (optionally placed between start and finish markers to create a visual impression of continuity). There will often also be markers running along one axis (e.g., running left-to-right or up-to-down) that indicate time points. Generally all of the task-related markers that are in line with a given time marker are associated with the time indicated on the time marker. In the illustrated example, time markers run from left to right along the top of the board 2 along the horizontal axis 10; all task markers that are vertically aligned or collinear with a given time marker are associated with that time.

In order to indicate at least two times, the board 2 will comprise a first and a second time marker 14, 16 arranged along the first axis 10 and reversibly attached to the board 2. The time markers 14, 16 each display a machine readable time code 18, 20 (respectively) that encodes a unique time 30, 32 and a human readable indicator 34, 36 of said unique time 30, 32. The machine readable code 18, 20 will generally be a two-color (black and white code), and not standard human-readable text. Examples of machine readable code 18, 20 include a bar code. All types of bar codes may be used, including 1 dimensional codes and 2 dimensional codes. In a specific embodiment the machine readable code 18, 20 is a QR code 450. QR codes have the advantage of high data density and virtually universal readability by handheld computing devices. The machine-readable code 18, 20 is a visual code, and does not transmit in the electromagnetic spectrum. Such codes could conceivably be printed with dyes or pigments that reflect or absorb in other than the visible portion of the electromagnetic spectrum.

The human-readable indicator 34, 36 may be any symbol, character, alphanumeric, pictograph, color code, or combination thereof that a human viewer could readily identify without technological assistance. The example shown in the drawings includes English language text, sometimes accompanied by a colored band to help the viewed categorize the marker. In that example colors indicate the nature of the marker (start, finish, time, setback, etc.), and the text describes the task 54 or the date. In an alternative embodiment, color can be used to indicate the party or group responsible for the task 54. The human-readable indicator 34, 36 will generally exclude machine-readable codes like barcodes.

In some embodiments of the method the task markers are generated as necessary to put new tasks on the board 2 and subsequently synch them with a digital tracking system. For example, a task 54 may be added to the digital system by a user with a mobile computing device 400, which then commands a printer 408 to print one or more task markers. The printer 408 may be configured to print a sticker, in which case the sticker is stuck to the board 2 or to a tile 200 that is placed on the board 2.

As shown in the illustrated embodiment, a task start marker 50 may be positioned so as to be approximately collinear with a first time marker 14 along the second (vertical) axis 12. In other words, the task start marker 50 is directly below the first time marker 14. Any task marker below the first time marker 14 will be associated with the time on the first time marker 14 (for example, there will be a marker for January $1^{st}$, and all task markers below it will be associated with January $1^{st}$). Of course, the time markers and task markers could be positioned in other systematic orientations, in which case the first and second axes 10, 12 may be other than horizontal and vertical.

A task finish marker 62 may also be positioned so as to be approximately collinear with the second time marker 16 along the second axis 12 and to be approximately collinear with the task start marker 50 along the first axis 10. In the illustrated example the start and finish markers 50, 62 are approximately collinear along a horizontal axis (i.e., same row), which each is collinear with a separate time marker along a vertical axis (i.e., they are under different date markers).

The illustrated example shows time markers 14, 16 in which the unique times 30, 32 are particular days, but they could just as easily represent other divisions of time, such as hours of the day or weeks of the year. The times are said to be "unique" because there will generally not be duplicate times on two separate time markers 14, 16.

The task markers shown are specific to the start and finish of a particular task 54. The identity of the task, and either "start" or "finish" are present in human-readable format. The machine readable code 52 includes the same information. The task markers 50, 62 do not need to convey information about start times and end times, as these can be changed by changing the location of the markers on the board 2. Some embodiments of the task markers 50, 62 exclude unnecessary start and end time information. Other sorts of task markers can be used. For example, milestone markers can indicate the time when a milestone 420 is to be achieved for a certain task, or the period during which a milestone 420 will be in process for a task 54. As another example, constraint markers can indicate a time period during which a constraint limits progress. Task markers 50, 62 may be color-coded by type to facilitate rapid visual recognition; and may also identify a person or group responsible for the task 54. The markers 50, 62 can be of any suitable dimension. In a preferred embodiment the task markers 50, 62 are 3"×2.5" sticky notes.

The method involves obtaining one or more digital images 70 that together include the machine-readable time codes 18, 20 and task codes 52. A given digital image 70 may be captured as a single image, or it may be a composite of multiple shots of the board 2. The software may then compute the relative position of two or more of the first time marker 14, second time marker 16, task start marker 50, and task finish marker 62 based on an analysis of the digital image 70. In the context of this disclosure the term "compute" refers to computations performed by a computing device 400, not by a human mind (in whole or in part). Using the relative positions of the markers, the computing device 400 can then assign the first unique time 30 as a start time 80 of the task 54 based on the computed relative positions 76, 72 of the task start marker 50 and the first time marker 14 and assign the second unique time 32 as a finish time 82 of the task 54 based on the computed relative positions 78, 74 of the task finish marker 62 and the second time marker 16. Referring to the example in the drawings, the computing device 400 would locate the time markers 14, 16 and determine which task markers are directly below each time marker 14, 16, then assign the corresponding time (start, finish, etc.) to each task according to the time marker directly above. This information may then be recorded as database information 80 on a machine-readable medium 90 accessible to the digital task management system 4. The database information 80 will include at least the task 54, the start time 80 of the task 54, and the finish time 82 of the task 54.

In a particular embodiment of the method (usable with the illustrated embodiment of the system), the top row 100 of QR codes have date values assigned to them. All other rows 102, 104, 106 have QR codes with tasks assigned to them. The user will use the mobile app 445 to continuously scan the entire wall, column by column, from top to bottom. Each time the scanner sees a date value (at the top of each column) it will assign that date to all of the activities that follow it, until it reaches another date value. The date values at the top of each column will be assigned to each of the activity QR code values that follows; whether it is a start or finish date for a particular task. Various other approaches to obtaining a digital image 70 of the board 2 and encoding the corresponding information can be used.

In the illustrated embodiment, the management board 2 is a slat wall 112. A slat wall 112 is a simple and versatile means for supporting objects at a variety of elevations. Commercially available slat walls 112 comprise multiple panels 230 separated by parallel grooves 232. The grooves 232 are usually T shaped in cross-section (although conceivably they could be L-shaped). For the purposes of this disclosure, the length of the stem of the T is said to be the "groove depth" 240 and the distance from the tip of the bar of the T to the point where the bar meets the stem is said to be the "groove width" 242. The grooves 232 in a slat wall 112 allow objects, such as markers, to be slid continuously along the horizontal axis smoothly and at a set height. Slat walls 112 are relatively inexpensive and can be mounted on a variety of horizontal substrates, making them practical "low-tech" forms of task board for use in the methods and systems disclosed herein.

Figure 2:
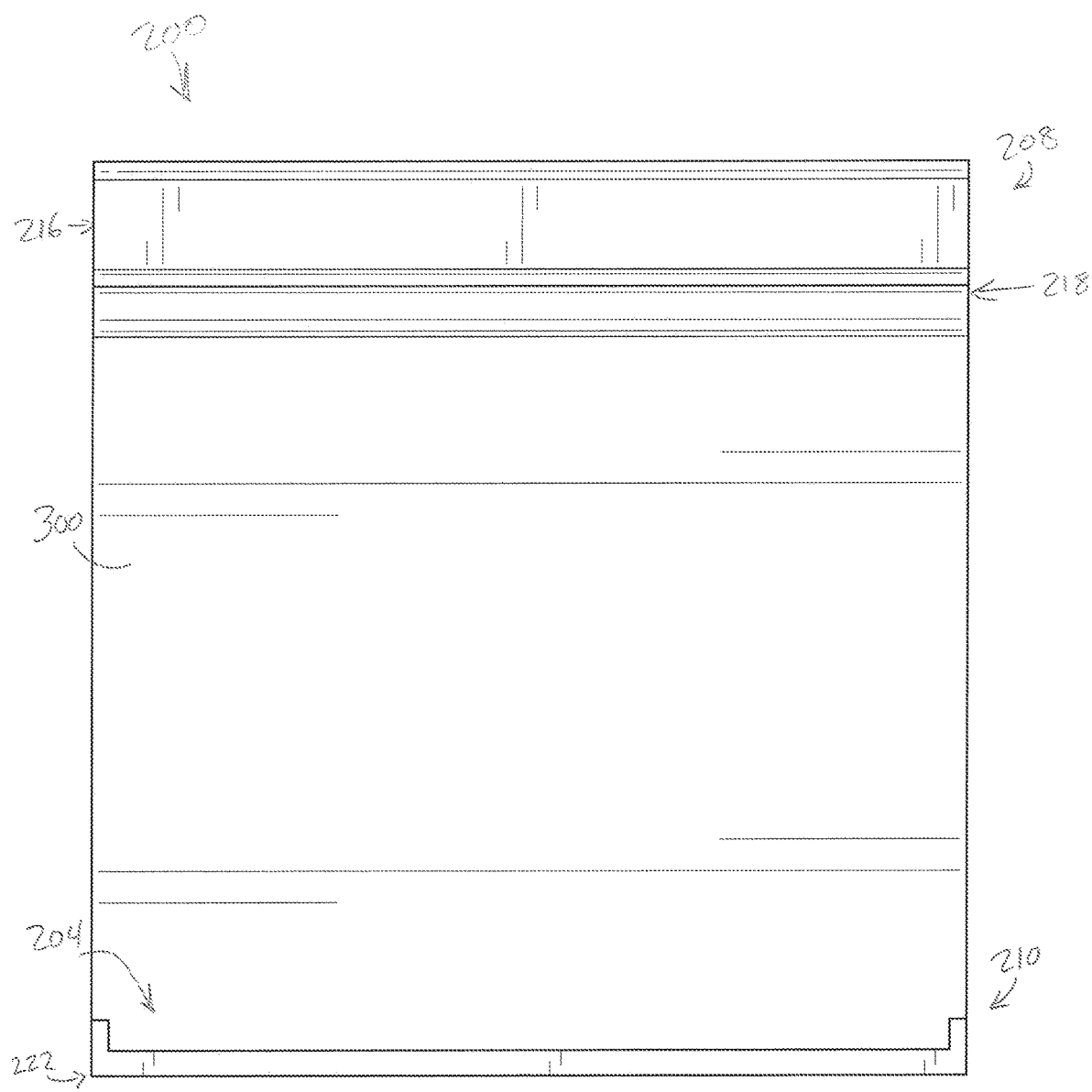
FIG. 2. A front view of the embodiment of the tile shown in FIG. 1.
Figure 3:
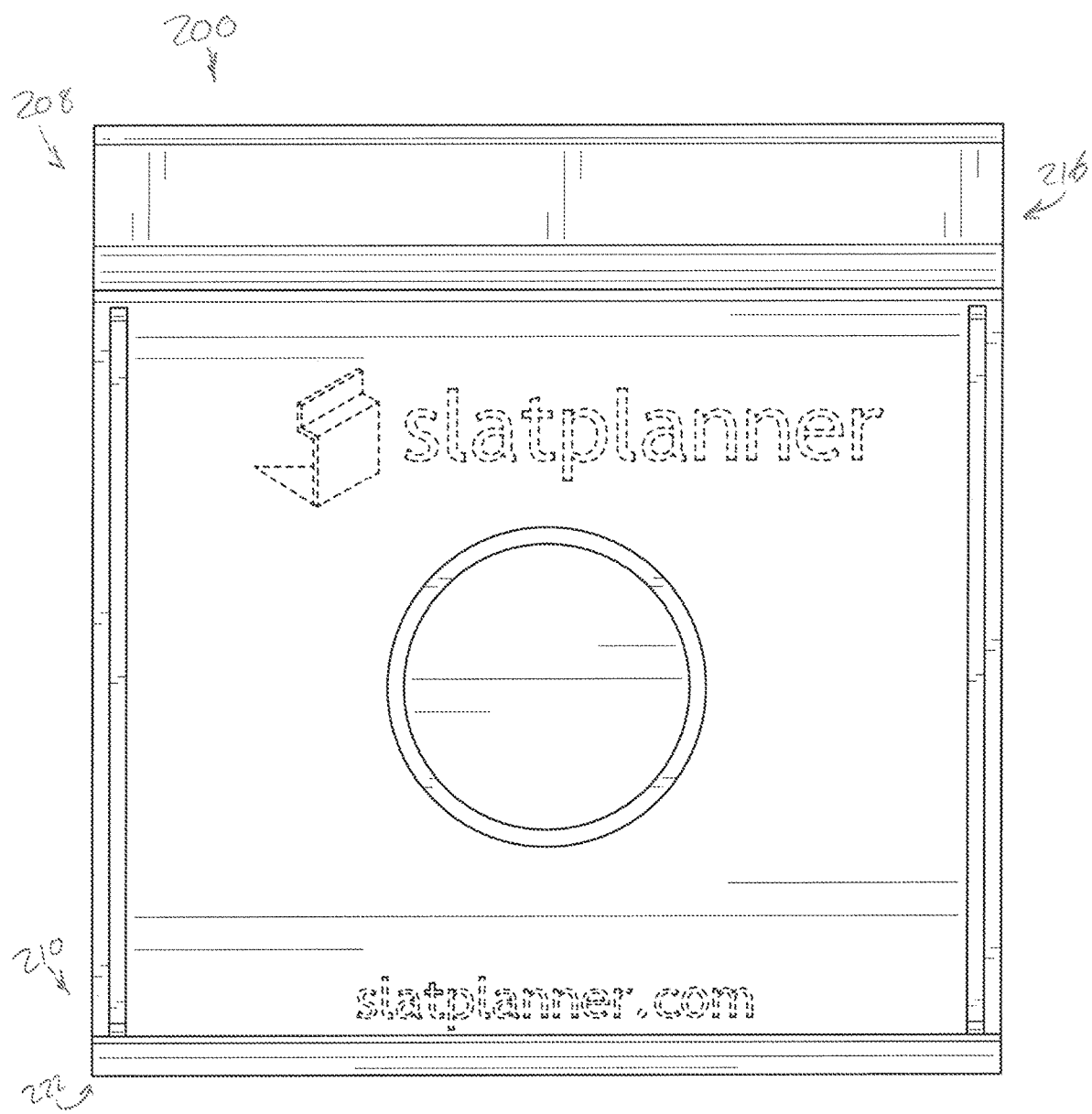
FIG. 3. A rear view of the embodiment of the tile shown in FIG. 1.
Figure 4:
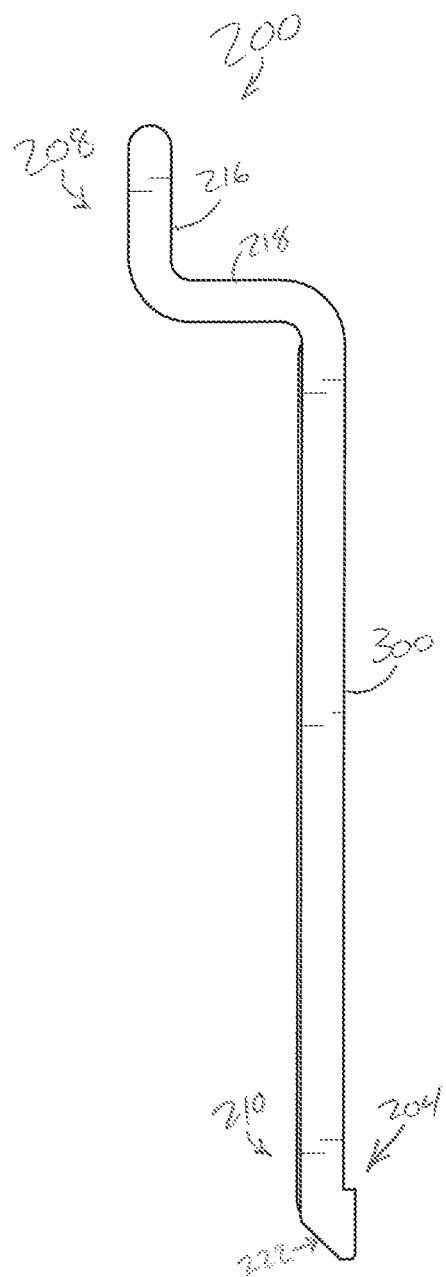
FIG. 4. A left side view of the embodiment of the tile shown in FIG. 1.
Figure 5:
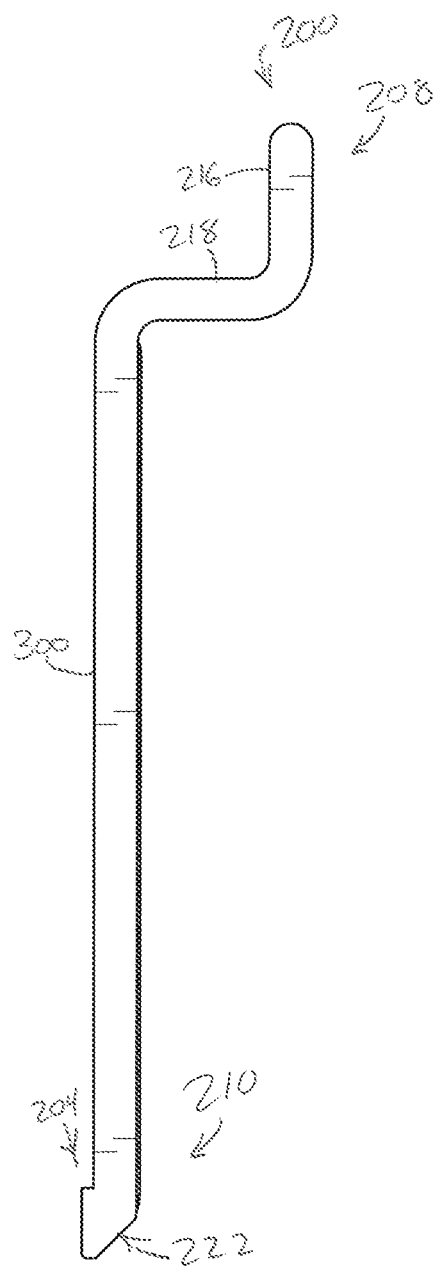
FIG. 5. A right side view of the embodiment of the tile shown in FIG. 1.
Figure 6:
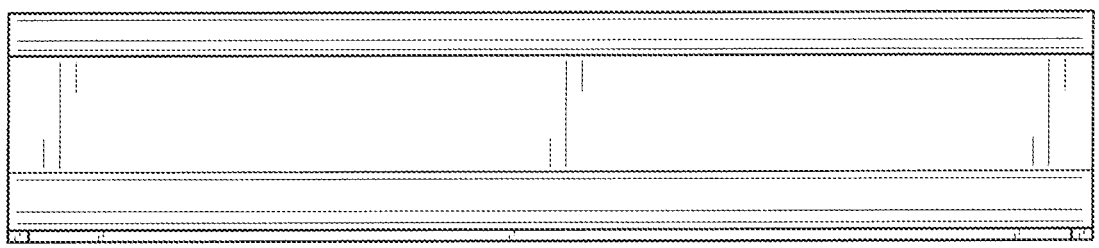
FIG. 6. A top view of the embodiment of the tile shown in FIG. 1.
Figure 7:
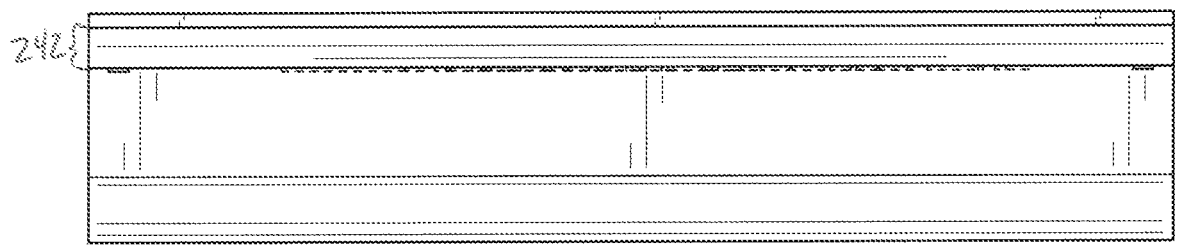
FIG. 7. A bottom view of the embodiment of the tile shown in FIG. 1.
Figure 8:
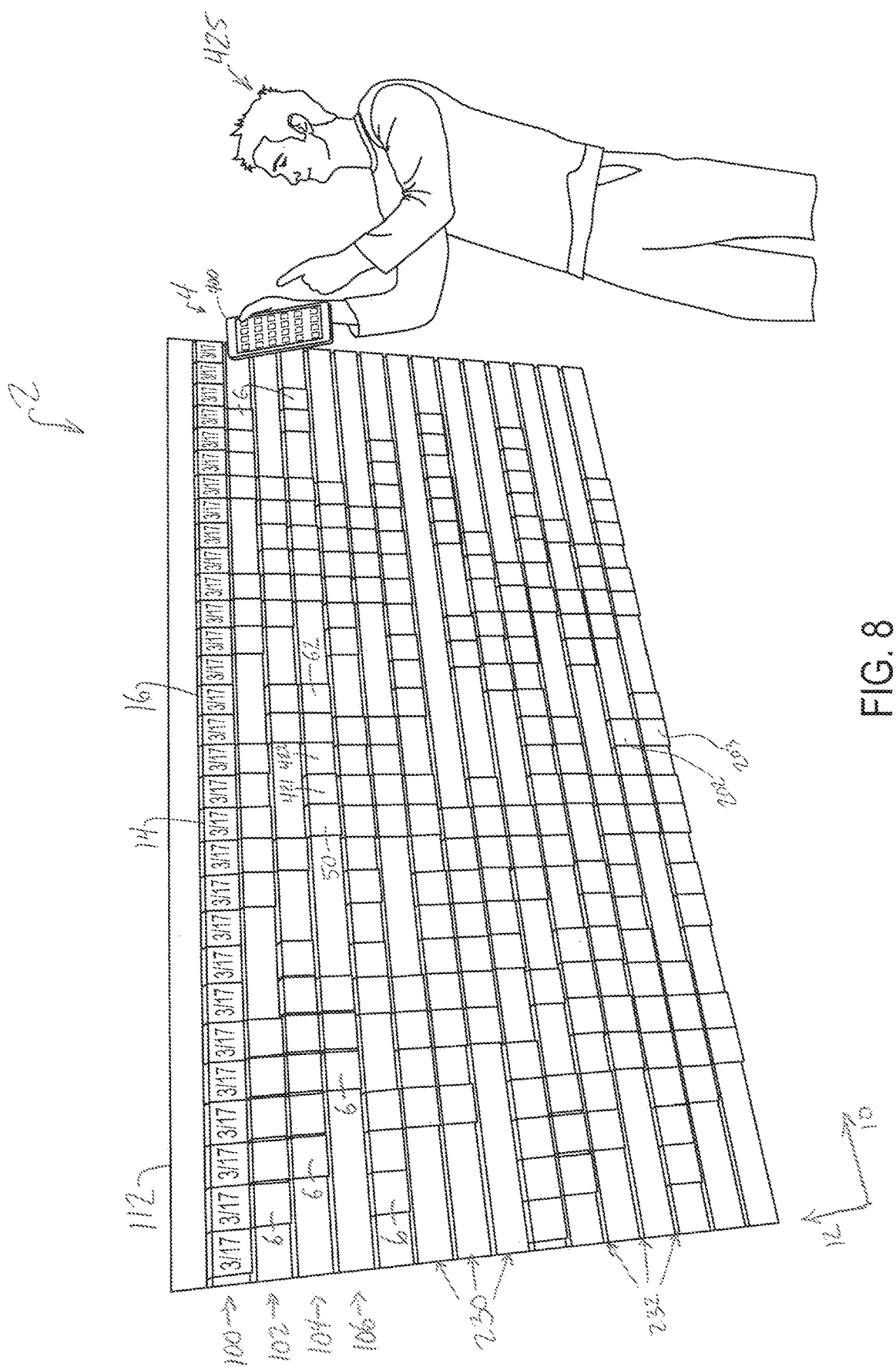
FIG. 8. An embodiment of the physical task management board based on a slat wall showing task markers, date markers, and a user employing a mobile device to image the board.
Figure 9:
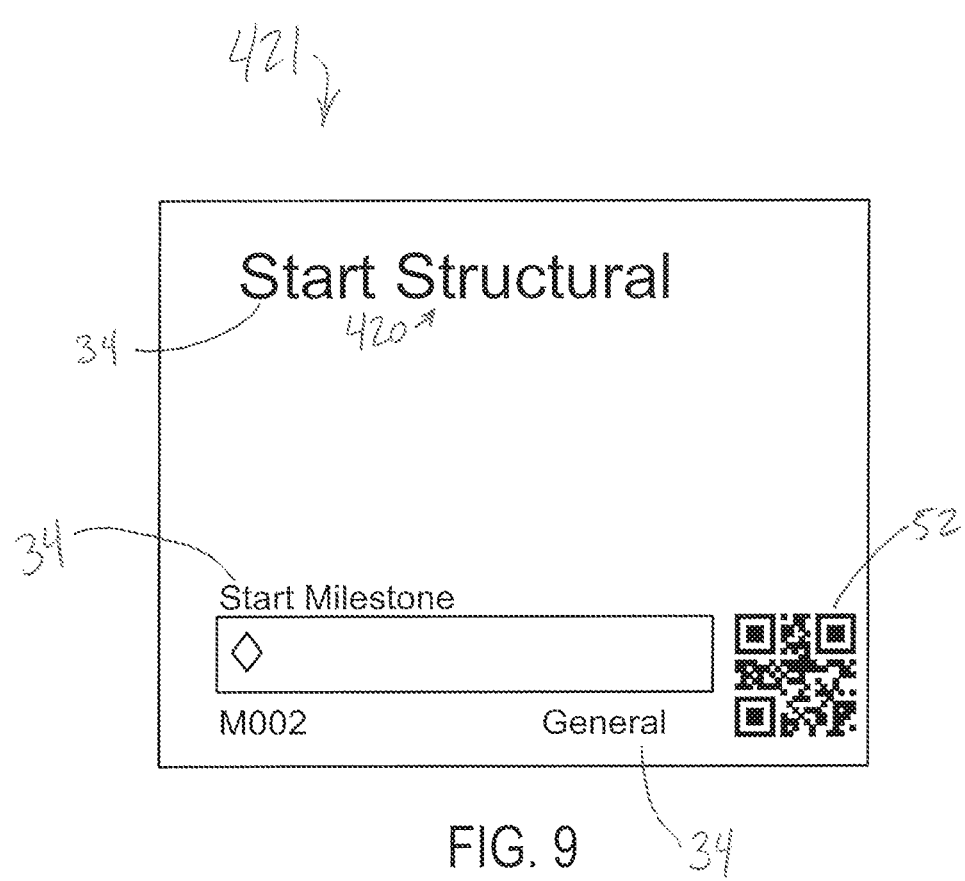
FIG. 9. An embodiment of a start milestone marker.
Figure 10:
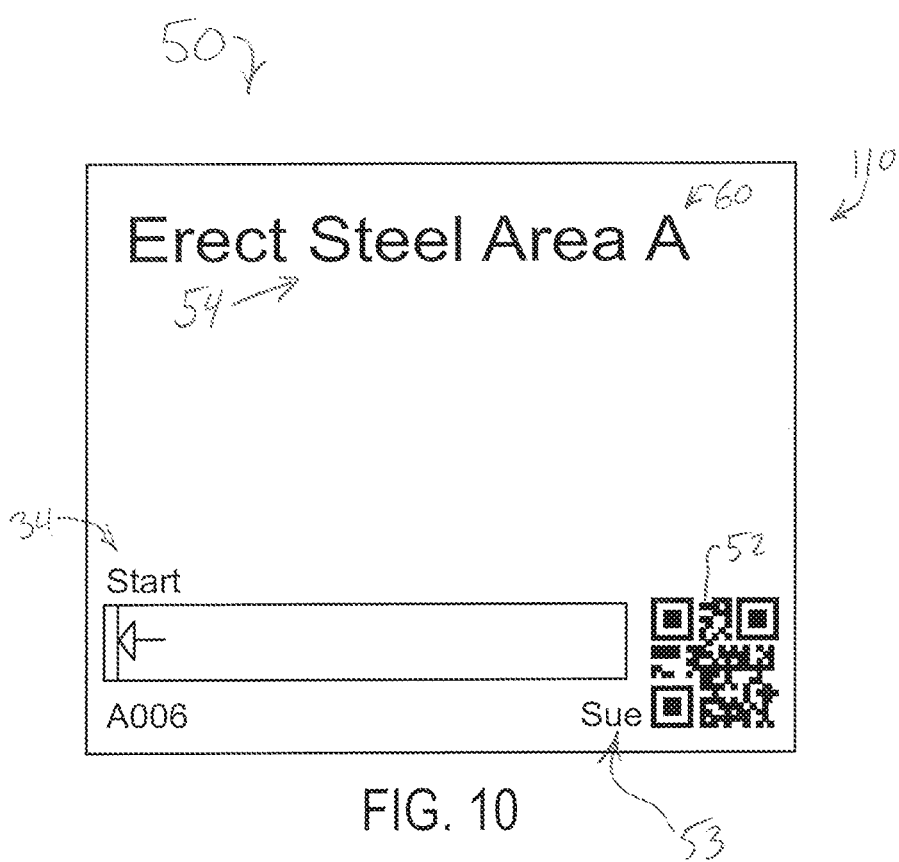
FIG. 10. An embodiment of a start task marker.
Figure 11:
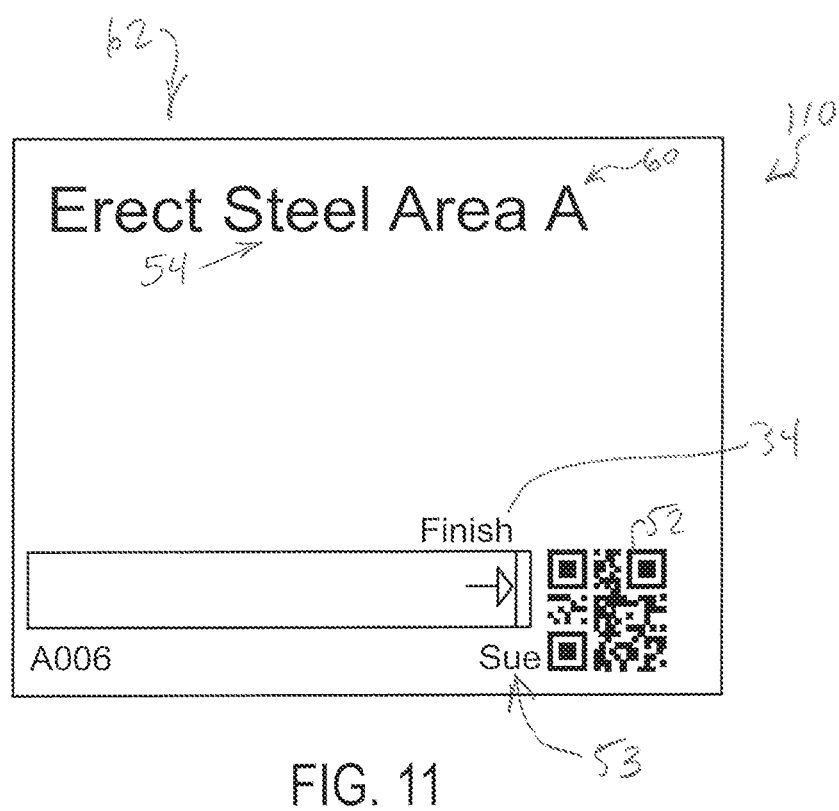
FIG. 11. An embodiment of a finish task marker.
Figure 12:
FIG. 12. An embodiment of a first time marker, which might be associated with a start task marker.
Figure 13:
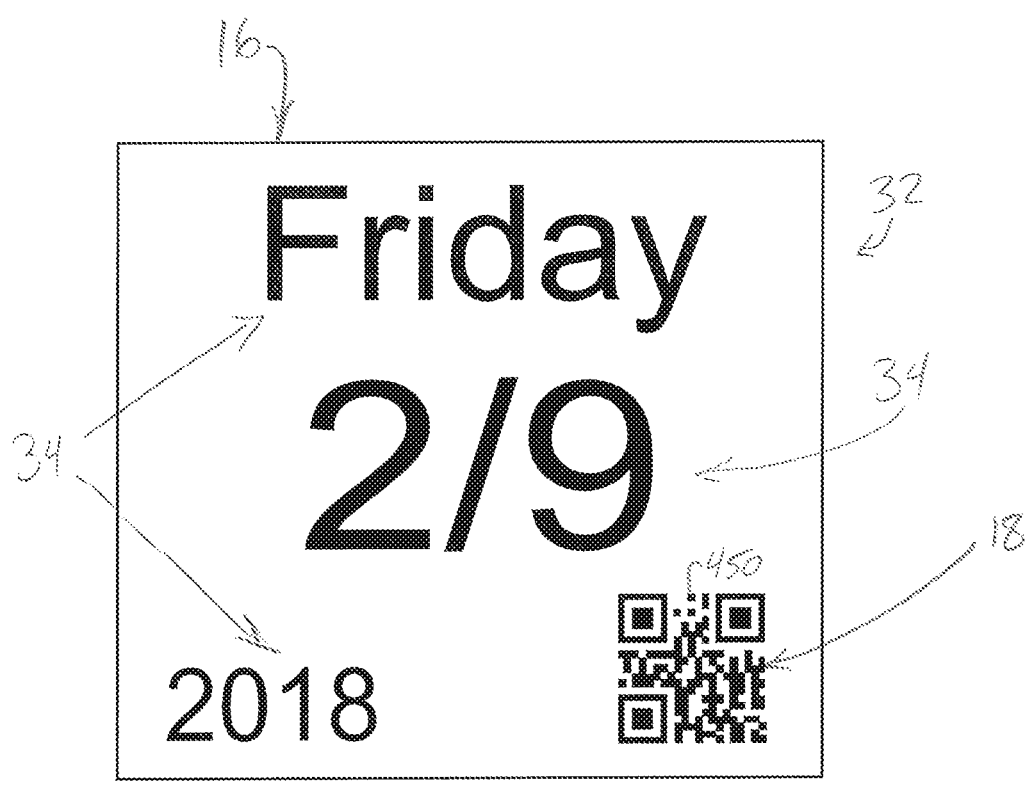
FIG. 13. An embodiment of a second time marker, which might be associated with a finish task marker.
Figure 14:
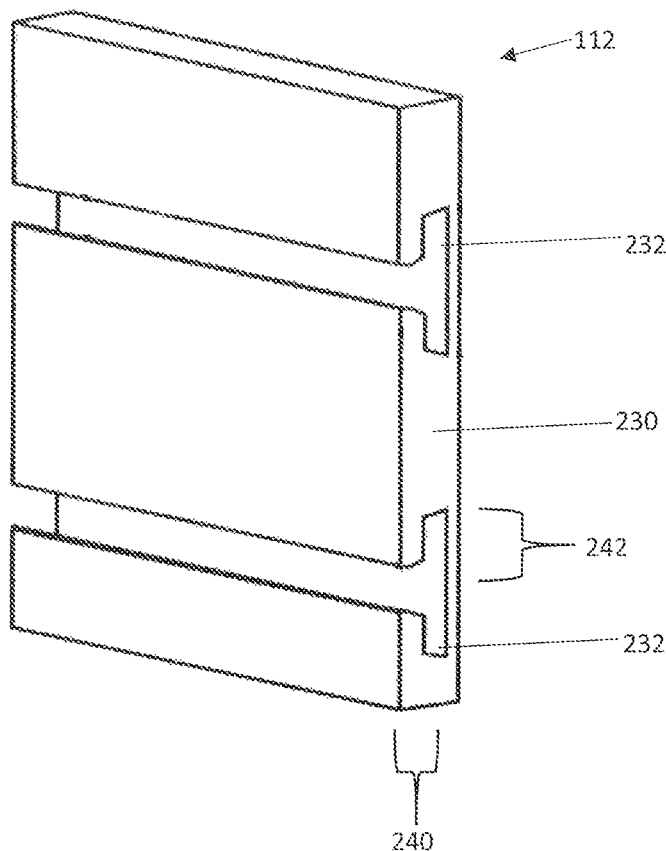
FIG. 14. Detail of an embodiment of a slat wall, illustrating the T-shaped cross-section of the groove.
Figure 15:
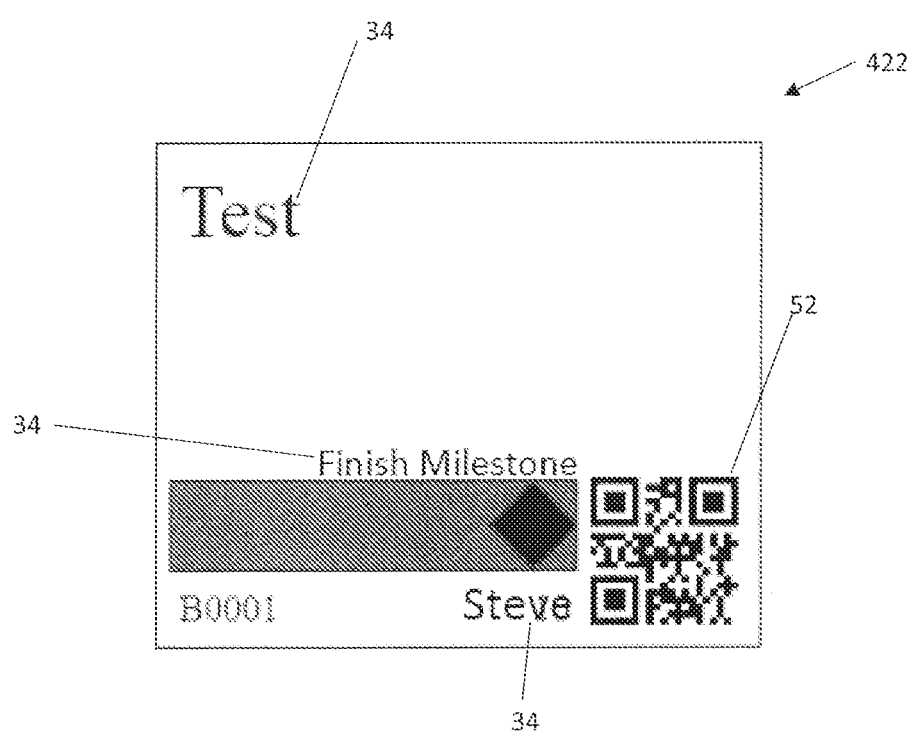
FIG. 15. An embodiment of a milestone finish marker.
Figure 16:
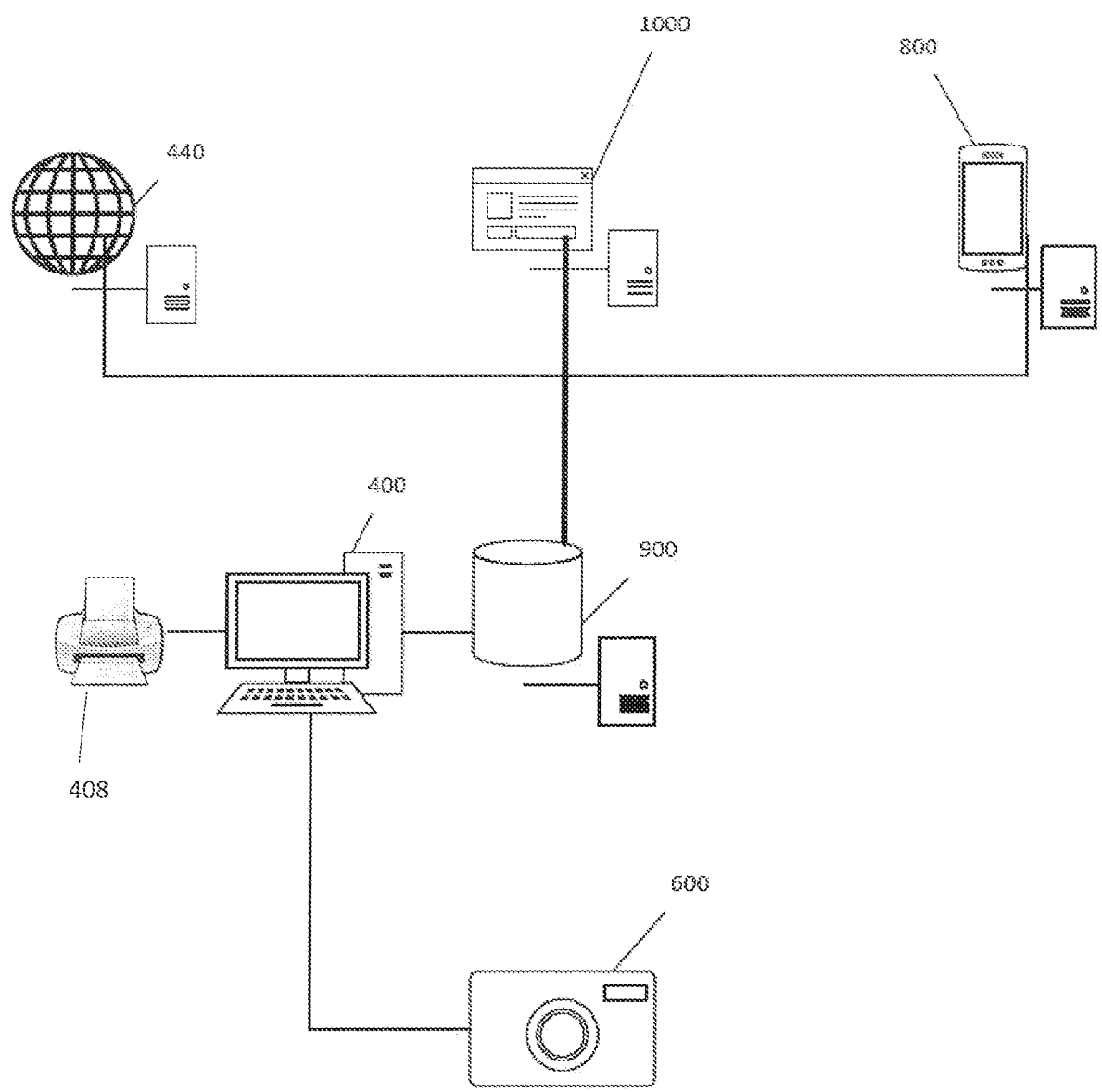
FIG. 16. An embodiment of a system described herein.

In some embodiments of the method the marker may be mounted on a tile 200 that is configured for attachment to a slat wall (e.g., slat wall 112). One embodiment of such a tile 200 is shown in FIGS. 1-5. The tile 200 can attach to the marker in various ways. In an exemplary embodiment the marker is printed on a sticky note, and the sticky note is stuck to the tile 200. In such embodiments it could be advantageous to construct the tile 200 of material on which the adhesive will not leave much residue. It has been discovered that dry erase surfaces (e.g., surface 300) resist such residue. Examples of dry erase surfaces include plastics, acrylonitrile butadiene styrene, melamine, painted metal, enameled metal, tempered glass, or polypropylene. In a specific embodiment the tile 200 is entirely constructed of acrylonitrile butadiene styrene. In a preferred embodiment the tile 200 is made of single-piece injection molded plastic, such as acrylonitrile butadiene styrene.

In the illustrated embodiment, the bottom section 210 of the tile 200 serves as the substrate for mounting the marker. Note the beveled lower edge 222 of the bottom section 210 in the illustrated embodiment allow a first tile 202 to be placed directly above a second tile 203 without interfering with the second tile 203 if it must be removed from the groove 232.

The top section 208 functions to attach the tile 200 to the slat wall 112, while allowing the tile 200 to be slid along the groove 232 for easy rescheduling. In the illustrated embodiment the top section 208 is L-shaped, having a vertical stem 216 and a horizontal bar 218. This configuration holds the tile 200 in place while allowing it to slide because wherein the slightly shorter than the groove width 242, and wherein the bar 218 is about as long as the groove depth 240. When the top section 208 is inserted into a groove 232 on a slat wall 112 the bar 218 extends into the groove 232 and the stem 216 extends behind one of the panels 230. As a result the tile 200 will not fall out of the groove 232, but can be removed by rotating it about the wall's horizontal axis 10.

The illustrated embodiment of the tile 200 further comprises a framing element 204 to assist in properly aligning the marker. The framing element as shown is a raised bracket that defines the bottom two corners of the marker. As shown the bracket runs along the length of the bottom edge, but could function adequately with one or more gaps between the corners. It is contemplated that the framing elements 204 could take other forms; for example, the framing elements 204 could define any two corners of the marker, or define any two edges of the marker (or both). Exact placement of the markers on the tile 200 has the advantage of allowing easier identification of the machine readable code and easier alignment of task markers with date markers.

The tile 200 is capable of use with a slat wall 112 in the absence of any separate marker. For example, information can be recorded on the tile 200 directly. Examples of such uses include the use of erasable print in the tile 200, such as by a dry erase marker or a grease pencil. It is also contemplated that erasable visual information could be printed directly on the tile 200 by a printer 408 or other automated means.

Systems for joint physical-digital task management systems may include additional components. For example, a digital camera 600 or scanner may be part of the system for obtaining one or more digital images 70. The digital camera 600 or scanner will have some sort of connection with a computer system in order to transmit the image to the computer system for processing. The connection must be suitable for transmitting the quantity of data in the image over a reasonable timeframe. This can include various wired and wireless connections, including conventional Wi-Fi, Bluetooth (UHF), infrared, and cellular signals. In a specific embodiment the digital camera is a component of a smart phone that is connected to the computer system over one or both of Wi-Fi or cellular. Some embodiments of the camera may be a wide-angle camera, in order to capture the entire board 2 in one shot. Further embodiments of the camera may include video capability or the capability to collect multiple images in rapid succession, in order to allow the user to scan the entire board 2, if the board 2 (or the portion of the board 2 to be analyzed) is too large in one or more dimensions to be captured within the field of a single photograph.

A computing system 8 may be provided that is programmed or configured to analyze the image and update the digital task management system 4 with data from the board 2. Such programming may be permanent or non-permanent. Programming could be accomplished by providing appropriate software or firmware, or by providing components with the appropriate hardwiring.

The computer system 8 includes a bus or other communication mechanism for communicating information, and a processor coupled with the bus for processing information. The computer system 8 also includes a main memory, such as a random access memory (RAM) or other dynamic storage device, coupled to the bus for storing information and instructions to be executed by the processor. Main memory also may be used for storing temporary variable or other intermediate information during execution of instructions to be executed by the processor. The computer system 8 further includes a read only memory (ROM) or other static storage device coupled to the bus for storing static information and instructions for the processor. A storage device, such as a magnetic disk or optical disk, is provided and coupled to the bus for storing information and instructions.

The computer system 8 may be coupled via bus to a display for displaying information to a computer user. An input device is coupled to the bus for communicating information and command selections to the processor. The input device may be a touchscreen. Another example of an input device is a keyboard. Another type of user input device is cursor control, such as a mouse, a trackball, or cursor direction keys for communicating direction information and command selections to the processor and for controlling cursor movement on the display. Cursor control devices typically have two degrees of freedom in two axes, a first axis (e.g., x) and a second axis (e.g., y), that allows the device to specify positions in a plane.

According to one embodiment of the invention, the digital project management system 4 is provided by the computer system 8 in response to the processor executing one or more sequences of one or more instructions contained in main memory. Such instructions may be read into the main memory from another computer-readable medium, such as a storage device. Execution of the sequences of instructions contained in the main memory causes the processor to perform the process steps described herein. One or more processors in a multi-processing arrangement may also be employed to execute the sequences of instructions contained in the main memory. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor for execution. Such a medium may take many forms, including, but not limited to, non-volatile media, volatile media, and transmission media. Non-volatile media include, for example, optical or magnetic disks, such as the storage device. Volatile media include dynamic memory, such as the main memory. Transmission media include coaxial cables, copper wire, and fiber optics, including the wires that comprise the bus. Common forms of computer-readable media include, for example, flash memory, hard disk, magnetic tape, any other magnetic medium, a CD-ROM, DVD, any other optical medium, floppy disk, a flexible disk, punch cards, paper tape, any other physical medium with patterns of holes, a RAM, a PROM, an EPROM, a FLASHEPROM, any other memory chip or cartridge, or any other medium from which a computer can read.

Various forms of computer-readable media may be involved in carrying one or more sequences of one or more instructions to the processor for execution. For example, the instructions may initially be borne on a magnetic disk of a remote computer. The remote computer can load the instructions into its dynamic memory and send the instructions over a telephone line using a modem. A modem local to the computer system 8 can receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on the storage device either before or after execution by the processor. The computer system 8 also includes a communication interface coupled to the bus. The communication interface provides a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic, or optical signals that carry digital data streams representing various type of information. The network link typically provides data communication through one or more networks to other data devices.

For example, the network link may provide a connection through the local network to the host computer or to data equipment operated by an Internet Service Provider (ISP). The ISP in turn provides data communication services through the worldwide packet data communication network, now commonly referred to as the "Internet." The local network and the Internet both use electrical, electromagnetic, or optical signals that carry digital data streams. The signals through the various networks and the signals on the network link and through the communication interface, which carry the digital data to and from the computer system 8, are exemplary forms of carrier waves transporting the information. The computer system 8 can send messages and receive data, including program codes, through the network(s), the network link, and the communication interface. In the Internet example, a server might transmit a requested code for an application program through The Internet, the ISP, the local network, and the communication interface. In accordance with one aspect of the invention, one such downloaded application provides a digital project management system 4 as described herein. The received code may be executed by the processor as it is received, and/or stored in the storage device, or other non-volatile storage for later execution. In this manner, the computer system 8 may obtain an application code in the form of a carrier wave.

The computing system 8 may be programmed or configured to analyze the digital images 70, specifically locating the computer readable codes on the markers. As explained above, the locations of the markers (which is related to the locations of the codes) indicate times associated with various task aspects, such as task start times and task finish times. The locations of the markers also indicate which markers apply to which task. For example, in the illustrated embodiments, the time of a task aspect is determined by under which time marker the task marker is found; and task markers in a given row are associated with the same task. The system may compute a computed relative position of each of the markers based on the image 70 or images. For example, the system may compute the relative locations 72, 74, 76, and 78 of the first time marker 14, second time marker 16, task start marker 50, and task finish marker 62 based on an analysis of the digital image 70 or group of digital images. In some embodiments of the system, the relative positions of the markers can be computed based solely on the digital image 70, without additional data inputs.

Once the relative locations of the markers has been computed, times can be assigned to each by the computing system. For example, given a digital image 70 containing a task start marker 50 and a task finish marker 62, the start and finish times 80, 82 for each can be assigned based on the location of each relative to corresponding time markers. In the illustrated embodiment this would take the form of identifying the time markers above each of the task start and task finish markers 50, 62 and assigning the corresponding start and finish times 80, 82 to the task 54. The start and finish data for the task 54 will then be saved as database information 84 on a machine readable medium 90 accessible to the management system 4.

The combined physical and digital project planning system may employ a workflow to enable a project schedule to be modified either on the physical board 2 or in the database 900, then synched with the database or board 2 respectively. An exemplary workflow might flow as follows. An activity (task) list may be built either on software running on a server 430 or by entering activities into an app running on a mobile device, in either case the information being added to the database. The activities are then automatically printed onto task markers that are stickers, which contain QR codes and relevant human language. The marker stickers are then arranged on the physical wall according to their time elements. The markers on the wall are then scanned to obtain a digital image 70 or images by a suitable digital imaging device (such as the camera on a smart phone), and the information derived from the digital image 70 is then imported into the database. Metrics for the project can then be automatically updated. The digital version of the task wall may be available to numerous computing devices, such as mobile devices (facilitated via a mobile application server 800), desktop computers, and laptop computers, via a web browser interface (maintained on a web server 440). The data may be presented in any of various forms, such as a spreadsheet or calendar with multiple columns for dates and multiple rows for tasks (or the reverse). Project metrics can be presented in tabular or graphic form. An Application server 1000 can facilitate the exchange and presentation of such information. Examples of suitable project metrics include plan achievement, failure reasons, and cumulative progress over time.

C. Prophetic Example

A preferred embodiment (to which the rest of this paragraph pertains) of the combined system involves a webserver 440 providing a front end website and a smartphone app running on the smartphones of multiple users 425. The phone application and the website contain synchronized data. All activities that are created or entered into the website are synchronized to an activity list on the phone application. Any activities or attributes that are modified on the phone application are synchronized back to the website. One function of the phone application is to scan the activities on a wall using the phone's camera and record the dates, which will be synchronized with the website, by a sequential scan of activities falling under each date column. The web server 440 will also produce sticky notes that contain dates and QR codes containing those dates. The date-containing sticky notes will be placed along the top row of the wall, with activities arranged below their corresponding dates. The phone app user will sequentially scan each column of sticky notes from top to bottom. The app will continuously scan and will automatically assign the last-scanned date to each subsequently scanned activity. These date assignments will then be synchronized back to the website where detailed Gantt charts, reports, comparisons, histograms, etc. can be produced. An alternative option for this preferred embodiment involves a phone app which can optically recognize the relative locations of the sticky notes and build a map of the location of the sticky notes, relative to each other. The web application will have the capability to store snapshots of the schedule and compare various schedule iterations, across multiple aspects of the project, such as a comparison of scheduled dates and allocations of resources. The finish dates will be processed in the web app, based on calendars, holidays, and durations. These finish dates will be fed back into the phone app, as it synchronizes. Various views from the web application will be made available on the phone app. This invention also has the potential to provide instant warnings of date conflicts, while the user is scanning the activities on the wall. It could even prompt the user for reasons of delay as soon as the user scans an activity that has been delayed. The synchronization is intended to be realtime, so that a computer screen can show a schedule and manpower histogram being generated, while a phone is scanning the wall.

When dates shift, the user will be prompted to list reasons for delays. These reasons will be automatically tracked and charted on static and time-scaled graphs. Users can assign dependencies, needs, predecessors, and issues to activities. These prerequisites to activity performance will each have assigned responsible parties and forecasted or actual dates of completion. If the dates for the prerequisite action items are in conflict with the activity dates, they will turn red to provide the team with warnings. Separate logs will allow various users to see which items they are responsible for, along with details such as required dates. Users responsible for various activities will have the ability to modify their forecasts and will also have a feature to "check in" on their tasks to record a time stamp of the last time they updated the status of their action items.

The website and phone app will have various logs that the user can view. They will be able to filter their action items by different categories, such as Procurement, Constraints, and Inspections. They will also be able to see a log of all activities that have changed dates, between two different snapshots/baselines. Users will also be able to chart out a graph which shows a rolling percentage of activities that were completed as planned. An easy way to track actual progress will be to select a status date and scan the wall. Each activity ahead of the status date can be automatically marked as complete on its current date. Another chart will show progress versus a previous, selectable baseline plan. It can be based on number of activities, activity days, or even manpower, to add more accurate weighting to the relative tasks.

Many of the features on the web-based panning tool will also be available on the phone application. One of these includes an Activity Detail window. This window shows all details relevant to a specific activity, on one screen. This even includes a list of prerequisites, dates, and assigned parties, along with a history of activity changes and reasons.

This example of a hybrid physical and digital planning solution will integrate with various pieces of existing digital software, including CPM-based and 40 scheduling software. Users will be able to import activity lists from other software, to this system, arrange activities on their physical wall, scan them back in, using this app, and upload the new activity dates to the software of their choice. Groups of users could physically arrange activities on their wall, then upload the results to a piece of 4D scheduling software and see a visual simulation of their schedule in 4D.

Access will be granted to account holding users by way of a website and a mobile app, both of which will have access to the database. The website will use DhtmlX for the main Gantt chart tool. All tasks imported from software such as P6 or Microsoft Project will come in as "project summary" tasks and will be formatted very thin and distinct. All tasks that the user adds will appear as sub-tasks to these project summary tasks. They will be colored based on the "person responsible" field that is assigned to each task. Constraints will behave much like tasks, but will have a distinct, rounded appearance. Most of the controls for the DhtmlX interface will be handled by a custom side bar, which will handle almost all of the functionality.

A sidebar will contain most of the functionality. It will be built using material components. It can be toggled open or collapsed, by clicking the menu button. A "task" sidebar will contain most of the menus. In this sidebar menu, users will create, add, and modify their tasks. This menu will allow users to create new "unscheduled" tasks. Tasks will stay in this list until they are scheduled either manually or by scanning the QR codes on the slat wall. These unscheduled tasks will be added as children to whichever task is currently selected in the Gantt window. When a user clicks on "add task" in the task sidebar, the "task detail" window comes up. It asks for the bare minimum information (to keep the interface simple) When the user toggles on "scheduled", they are allowed to manually enter dates. When they click the "expand" button, additional (optional) fields are displayed. Users can assign constraints, which show up as chips. In the "constraint" sidebar, users will be able to add constraints. Constraints are events or issues that could potentially delay tasks. Constraints will behave much like activities, though constraints will be kept unique and will have "Reason" codes assigned to them. Constraints can be assigned to activities in a many-to-many relationship.

In the "snapshots" sidebar window, users will create baseline copies of the schedule, called "snapshots." Snapshots will allow schedule comparisons from one update to another, which drives the metrics such as "planned percent complete." The latest snapshot date will also act as the project's data date. All tasks preceding the latest snapshot date are considered "completed." All activities that finish after the latest snapshot date are considered "remaining." When a new snapshot is created, it will then list all of the activities between the current and previous snapshot that started or finished later than planned (during the period between the latest and previous snapshots). The user will then click on each delayed activity to expand the list of "reasons" and they will select a "reason" for the delay of each activity. This data will be used in the metrics.

In the settings window, the administrator will set the project-specific values. Both delay reasons and constraint types are now simply called "reasons." In the "users" sidebar window, project users are added and their permissions are set. An administrator can add users to the project and set their levels of access. There must always be at least one administrator. Only administrators can change the project settings. Users are also associated with a "Responsible" company. These users are essentially authorized to act in behalf of their respective companies (see Responsible). In the "responsible" sidebar window, responsible parties (companies) are added and managed. Responsible companies will have a logo, which is either uploaded, or simply a colored box with their company initials. Users can be added to each responsible company. In the "calendar" sidebar window, activity calendars are created and modified. Users can name their calendars and choose standard work days. "Non-work exceptions" are days that are normally work days, but will not be worked. "Work Exceptions" are days that are normally non-work days, which will be worked. When selecting exception dates, date ranges can also be selected. In the "reasons" sidebar window, "reasons" are created and maintained. Reasons are assigned to both "constraints" and "plan failures" (reasons the task did not complete on time). Reason codes allow the user to select an icon that visually represents their reason. Reasons do not have assigned colors. The colors will come from the color of the team responsible for the constraint. In the "task code" sidebar window, "task codes" are created. These are essentially user-defined values that users can assign to their activities. They will be able to create hierarchical trees, if desired, which can be assigned to activities. As the user drills into a field, they can add new values at any level. These fields will be used for grouping and filtering the Gantt chart and for filtering various reports.

Additional windows will include a "create account" window, login window, account information window, window to access automatic daily project backups, a project dashboard window that shows the user a list of his or her projects, and paid subscription window (for projects that require more than 50 tasks).

The mobile app will have login and register pages, corresponding to those on the website. A task window will show all of the scheduled tasks. These can be filtered with the filter button. The tasks are grouped by start date, ascending. The user can scroll through the tasks by either swiping up and down on the list, or by dragging the top timescale left and right. If the user swipes the activity list to the side, they will see the list of "unscheduled tasks" which can also be filtered. Unscheduled tasks are tasks that do not have dates yet. The "responsible" logo or initials show up on the list next to each task. An icon to the right of each task shows its status (not started, started, finished) depending on how filled in it is. When the user clicks on a "Filter" button in the task window, they will see the picture on the left, which provides multiple options. A "show completed" toggle chooses whether or not completed (finished) tasks are displayed. If the user clicks on one of the filter criteria the window comes up.

The app has an "activity detail" window, which comes up when a user clicks on a task in the task list; it simply shows the current task information, in an editable format. At the bottom of the screen, it lists the snapshot dates and shows how the activity start and finish dates have shifted with each snapshot.

When the user clicks on the plus (+) button on the task list window, the "new task" window appears. Here, the user can name the task and assign values to the fields. the user can optionally assign dates (set dates) to the task. This toggle is set to "off" by default. If the user sets dates, it will be considered a "scheduled task." Otherwise, the user will be creating an "unscheduled task." Constraints can be assigned to tasks in this window, along with a URL and notes.

When the user is selecting a value to assign to an activity, they can optionally click the plus (+) button and create new values for most fields. These are the windows that come up when they want to add a new value. Values can be hierarchical (tiered). If this is the case, they will select a parent value. Adding new values via the mobile app could be left to a later phase, as necessary.

The constraints window in the app is reached by tapping the "constraints" button at the bottom of the screen (the plus/delta tool will be built into a separate app and can be removed from this scope). Here, the user can view and filter constraints, much like activities. Constraint logos use the color of the Responsible field and the icon of the constraint type. Users can also create constraints by hitting the plus button at the top. As with activities, if the user taps on a constraint, the "constraint detail" window appears and simply shows the values associated with the constraint in an editable format. Affected tasks can be added to constraints in a many-to-many relationship. When the user selects "add new affected task," a task list shows up that the user can filter. The user can then select/de-select multiple tasks. If the user clicks on the plus button in the constraints window, the "new constraint" window shows up. This is similar to the constraint detail window, except new constraints start off blank.

When the app user clicks on the QR icon button at the bottom of the screen, a "scan" window appears. This window triggers the mobile device to scan continuously and builds a list of scanned QR codes as it goes. The most recent date code scanned is displayed as a date. Each subsequent QR code scanned is listed below it. At the bottom, there are buttons to turn haptic and audio feedback on or off. A visual checkmark should appear in the scan window with each successful scan. The back button undoes the last scanned value (in case of mistakes).

The app will also have a main menu. If the user presses the menu button in the top left corner of the screen, this menu will appear. Users can sign out (by default they will stay signed in forever). Users will see the list of projects that they are assigned to and can switch projects by tapping a different one. The software version number will be displayed next to "About", for easy reference.

Metrics will be available through the website, and possibly through the mobile app.

A "Plan Achievement" graph 500 will show a series of lines plotted on a percentage graph. These lines represent the percentage of activities that were completed as planned during the last Snapshot period. Programmatically, for each snapshot, the website will take a list of activities that should have started or finished between the previous snapshot and the current snapshot. It will then determine which of these activities actually started or finished early or on time during that period. It will then divide these numbers to produce a percentage. This graph 500 will include a line for each "Responsible", and will be colored by "Responsible." There will also be a value for "Total", which will be a black, dashed line. Users can filter this graph by various activity fields.

"Failure Reasons" will be presented as a stacked area graph 505. This graph totals the "Reason" codes for each activity that were not completed as early or on-time, during the last "Snapshot" period. Programmatically, for each snapshot, the website will take a list of activities that should have started or finished between the previous baseline and the current baseline. It will then determine which of these activities did not actually start or finish during that period and total up the Reason codes. This will be a stacked graph 505 and will use a different color for each "reason." There will be filters for various activity fields. This graph 505 can also be toggled into a pie chart that shows the project total, in lieu of the area graph by snapshot.

A "Progress Curve" graph 510 will show a cumulative line for each entire snapshot, plotted over time. Each line is a cumulative representation of the manpower histogram. Programmatically, for each date on the X axis, the website will add up the total number of Crew Size that are planned to work each period. It will then add these up cumulatively, showing the total-to-date for each date. The date range (X axis) will include the dates from all scheduled activities. Each line is colored differently, to represent each unique baseline. There will be filters for various activity fields.

Users will need to be able to Import/Export to/from the following formats: Primavera P6 (import activities to Gantt Chart, export entire schedule with SlatPlanner tasks as "steps" to P6 activities, Microsoft Project (import activities to Gantt, export entire schedule with SlatPlanner tasks as sub-activities to MSP activities), CSV/XLSX (to export constraint lists and activity lists), PDF (for charts), and Procore schedule module (upload MSP XML file through API).

D. Conclusions

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

The following is claimed:

1. A method of synching a physical task management board with a digital task management system, the method comprising:
   (a) providing a physical task management board having a first axis and a second axis, the physical task management board comprising:
      (i) a first and a second time marker arranged along the first axis and reversibly attached to the board, each said time marker comprising a first and second machine readable time code (respectively) that encodes a unique time and a human readable indicator of said unique time;
      (ii) a task start marker positioned so as to be approximately collinear with the first time marker along the second axis, the task start marker comprising a machine readable task code that encodes a task and a human-readable indicator of said task; and
      (iii) a task finish marker positioned so as to be approximately collinear with the second time marker along the second axis and to be approximately collinear with the task start marker along the first axis, the task finish marker comprising the machine readable task code and the human-readable indicator of said task;
   (b) obtaining at least one digital image of the physical task management board that together include the first machine readable time code, the second machine readable time code, the machine readable task code on the task start marker, and the machine readable task code on the task finish marker;
   (c) computing a computed relative position of each of the first time marker, second time marker, task start marker, and task finish marker based on an analysis of the at least one digital image;
   (d) assigning the first unique time as a start time of the task based on the computed relative positions of the task start marker and the first time marker;
   (e) assigning the second unique time as a finish time of the task based on the computed relative positions of the task finish marker and the second time marker; and
   (f) recording database information on a machine readable medium accessible to the digital task management system, the database information including the task, the start time of the task, and the finish time of the task.

2. The method of claim 1, wherein the act of obtaining the one or more digital images comprises: obtaining a first series of digital images by scanning the first time marker and the task start marker along the second axis; and obtaining a second series of digital images by scanning the second time marker and the task finish marker along the second axis.

3. The method of claim 1, wherein the act of obtaining the one or more digital images comprises: obtaining a first series of digital images by: scanning the first time marker; scanning along the second axis until all task markers collinear with the first time marker have been scanned; assigning the time associated with the first time marker to all tasks associated with said task markers collinear with the first time marker; scanning the second time marker; scanning along the second axis until all task markers collinear with the second time marker have been scanned; and assigning the time associated with the second time marker to all tasks associated with said task markers collinear with the first time marker.

4. The method of claim 1, wherein the first axis is a horizontal axis and the second axis is a vertical axis approximately orthogonal to the horizontal axis, wherein the first and second time markers are arranged in a first row along the top of the physical task management board, wherein the task start marker and the task finish marker are arranged in a second row below the first row, and wherein the act of obtaining the one or more digital images comprises:
   (g) obtaining a first series of digital images by scanning vertically to image the first time marker and the task start marker; and
   (h) obtaining a second series of digital images by scanning vertically to image the second time marker and the task finish marker.

5. The method of claim 1, wherein at least one of the first time marker, the second time marker, the first task marker, and the second task marker is backed by a low-tack pressure sensitive adhesive that allows reversible adhesion to the physical task management board.

6. The method of claim 1, wherein the physical task management board is a slat wall.

7. The method of claim 1, wherein at least one of the first time marker, the second time marker, the first task marker, and the second task marker is mounted on a tile that is reversibly attached to the physical task board.

8. The method of claim 7, wherein the tile comprises:
   (g) a top section contiguous with a bottom section, the top section being L-shaped having a vertical stem and a horizontal bar;
   (h) the bottom section comprising a flat marker surface dimensioned to accept the marker, and having a beveled lower edge such that the thickness of the bottom section decreases in the downward direction.

9. The method of claim 7, wherein the physical task management board is a slat wall that comprises multiple panels between multiple parallel grooves each having a groove depth and a groove width, and wherein the stem is slightly shorter than the groove width, and wherein the bar is about as long as the groove depth, such that when the top section is inserted into a groove on a slat wall the bar extends into the groove and the stem extends behind one of the panels.

10. The method of claim 9, wherein the groove in the slat wall is shaped in cross-section like a T having a second stem and a second bar, wherein the groove width is equal to the distance from the tip of the second bar to the point where the second bar and the second stem meet, and wherein the groove depth is equal to the length of the second stem.

11. The method of claim 7, wherein the tile is surfaced with dry erase material.

12. The method of claim 7, wherein the tile is constructed from acrylonitrile butadiene styrene.

13. The method of claim 1, wherein the computing device receives a request for a new task from a user, the request comprising a task name, a task start time, and a task finish time, the method comprising: printing a new task start marker having a third machine readable time code at a printer local to the board; printing a new task finish marker having a fourth machine readable time code at the printer local to the board; placing the new task start marker on the board collinear with a third time marker along the second axis; placing the new task finish marker on the board collinear with a fourth time marker along the second axis; and rescanning the board to obtain at least one digital image of the board that together include the third machine readable time code, the fourth machine readable time code, a machine readable task code on the second task start marker, and a machine readable task code on the second task finish marker;

wherein the third and fourth time markers are not the same time marker, but one or both of which may be the same as the first or second time marker.

14. The method of claim 1, wherein the computing device receives a request for a milestone from a user, the request comprising a milestone name, a milestone start time, and a milestone finish time, the method comprising:

(g) printing a milestone start marker having a third machine readable time code at a printer local to the board;

(h) printing a milestone finish marker having a fourth machine readable time code at the printer local to the board;

(i) placing the milestone start marker on the board collinear with a third time marker along the second axis;

(j) placing the milestone finish marker on the board collinear with a fourth time marker along the second axis; and (k) rescanning the board to obtain at least one digital image of the board that together include the third machine readable time code, the fourth machine readable time code, a machine readable task code on the milestone start marker, and a machine readable task code on the milestone finish marker;

wherein the third and fourth time markers are not the same time marker, but one or both of which may be the same as the first or second time marker.

15. The method of claim 14, wherein the milestone start marker and the milestone finish marker are both approximately collinear with the task start marker and the task finish marker, and wherein the milestone start marker and the milestone finish marker are both in between the task start marker and the task finish marker.

16. The method of claim 1, wherein the database information includes a title of the task and a party responsible for the task.

17. The method of claim 1, comprising making the database information available to a plurality of users through a web server and a mobile application server.

18. The method of claim 1, wherein the machine-readable codes are QR codes, and wherein the human-readable indicators are alphanumeric text.

19. The method of claim 1, wherein the database information is recorded in a data structure on machine-readable media, and wherein the data structure contains task data for a plurality of additional tasks that are reflected on the board in a plurality of additional task markers, and wherein the information in the data structure is available to multiple users through a web server and a mobile application server.

20. The method of claim 19, wherein the information in the data structure is available to the multiple users as one or more graphical representations selected from the group consisting of:

a plan achievement chart displaying a date axis, a rate of planned tasks completion axis, and at least one set of data points for a person or party assigned to complete one or more of said planned tasks;

a failure reason chart displaying a date axis, a quantity of failed tasks axis, and at least one set of data points for a cause of failure of said failed tasks; and a progress chart displaying a date axis, a quantity of labor units axis, and at least one set of data points showing the cumulative amount of labor expended for a given task.

21. A joint physical-digital task management system, the system comprising:

(a) a slat wall comprising multiple panels between multiple parallel grooves each having a groove depth and a groove width;

(b) multiple tiles each comprising a top section being L-shaped and having a vertical stem and a horizontal bar, wherein the stem is slightly shorter than the groove width, and wherein the bar is about as long as the groove depth, inserted into a groove on the slat wall such that the bar extends into the groove and the stem extends behind one of the panels, the multiple tiles including:

(i) a first time marker reversibly attached to a first tile of said multiple tiles, the first time marker comprising a first machine readable time code that encodes a first unique time and a human readable indicator of said unique time, (ii) a second time marker reversibly attached to a second tile of said multiple tiles, the second time marker comprising a second machine readable time code that encodes a second unique time and a human readable indicator of said unique time;

(iii) a task start marker reversibly attached to a third tile of said multiple tiles, the task start marker comprising a machine readable task code that encodes a task and a human-readable indicator of said task;

(iv) a task finish marker reversibly attached to a third tile of said multiple tiles, the task finish marker comprising the machine readable task code and the human-readable indicator of said task;

(c) a digital camera for obtaining a digital image of the multiple tiles;

(d) a computing system programmed or configured to (i) analyze the digital image, (ii) compute a computed relative position of each of the first time marker, second time marker, task start marker, and task finish marker based on an analysis of the digital image or group of digital images;

(iii) assign the first unique time to a start time of the task based on the computed relative positions of the task start marker and the first time marker;

(iv) assign the second unique time to a finish time of the task based on the computed relative positions of the task finish marker and the second time marker; and (v) record database information on a machine readable medium accessible to a digital task management system, the database information including the task, the start time of the task, and the finish time of the task.

\* \* \* \* \*